United States Patent [19]

Bryne

[11] Patent Number: 4,942,778

[45] Date of Patent: Jul. 24, 1990

[54] CLIPLESS BICYCLE PEDAL SYSTEM

[76] Inventor: Richard M. Bryne, 2172 Pine St., San Diego, Calif. 92103

[21] Appl. No.: 377,223

[22] Filed: Jul. 10, 1989

[51] Int. Cl.$^5$ .............................................. G05G 1/14
[52] U.S. Cl. .................................. 74/594.6; 74/594.4; 36/131; D12/125
[58] Field of Search ................... 74/594.6, 594.4, 560; 36/131, 132; D12/125

[56] References Cited

U.S. PATENT DOCUMENTS

| | | | |
|---|---|---|---|
| 3,964,343 | 6/1976 | Lauterbach | 74/594.6 |
| 4,685,351 | 8/1987 | Pegg | 74/594.4 |
| 4,803,894 | 2/1989 | Howell | 74/594.6 |
| 4,815,333 | 3/1989 | Sampson | 36/131 X |
| 4,827,633 | 5/1989 | Feldstein | 36/131 |

FOREIGN PATENT DOCUMENTS

| | | | |
|---|---|---|---|
| 3315282 | 10/1984 | Fed. Rep. of Germany | 36/131 |
| 3631302 | 4/1987 | Fed. Rep. of Germany | 36/131 |

Primary Examiner—Vinh T. Luong
Attorney, Agent, or Firm—Brown, Martin, Haller & McClain

[57] ABSTRACT

A clipless bicycle pedal system incorporating a pedal and cleat, the pedal being a block with a generally convex symmetrical curved top and bottom surface and being circular in the lateral plane. Grooves are formed in the circumferential edge of the block, with at least one groove each in the leading and trailing edges of the block. The cleat is a plate which is to be fixed to the sole of a rider's shoe and has a concave recess therein which corresponds to the convex surface of the pedal block. Within the recess is a spring-loaded tongue which is adapted to be removably seated in the grooves of the pedal block.

23 Claims, 4 Drawing Sheets

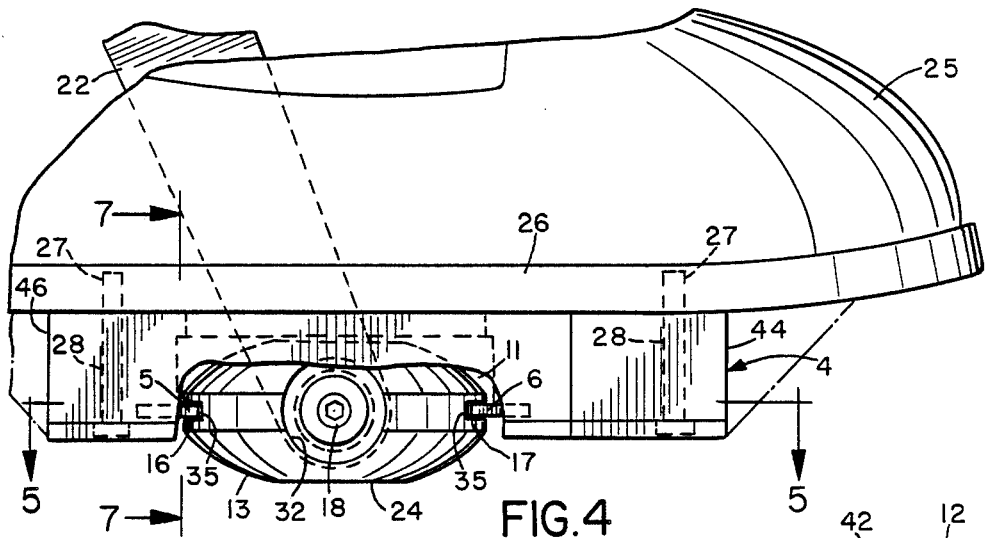
FIG.4
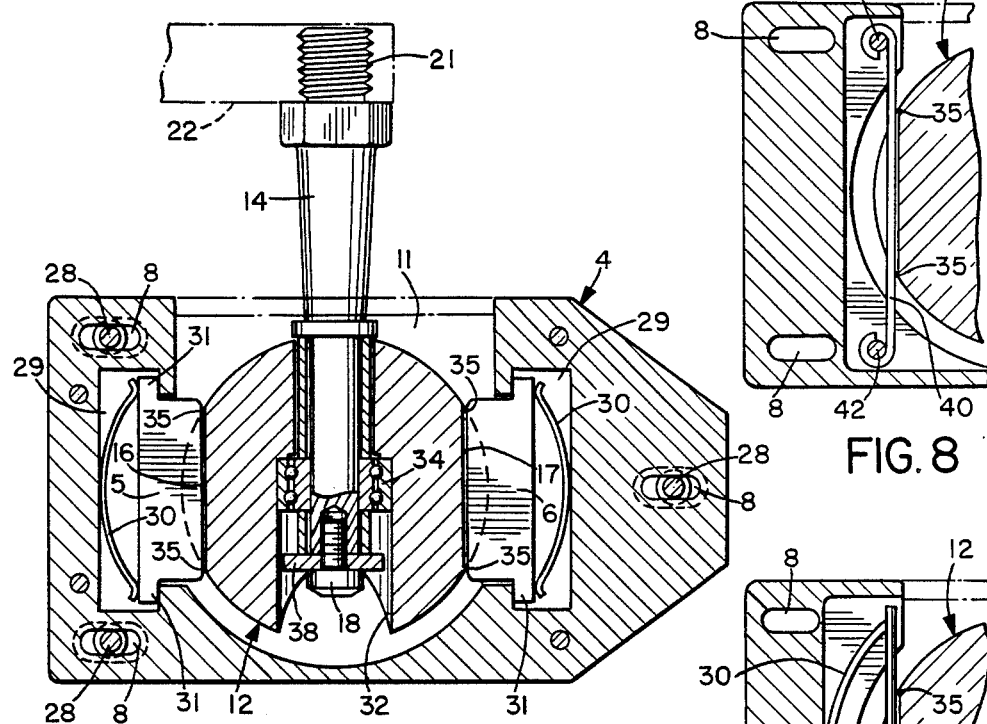
FIG.5
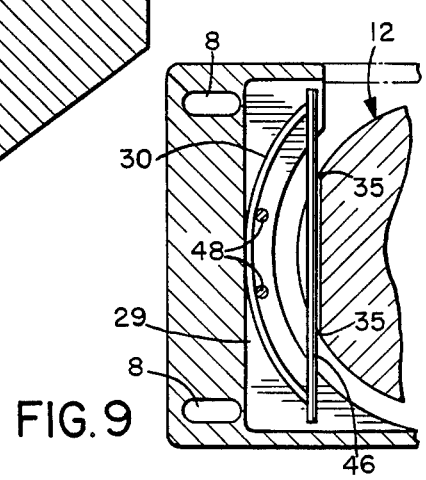
FIG.8
FIG.9

CLIPLESS BICYCLE PEDAL SYSTEM

FIELD OF THE INVENTION

The invention herein relates to bicycle equipment. More particularly it relates to pedal-and-cleat systems commonly referred to as "clipless bicycle pedals."

BACKGROUND OF THE INVENTION

In recent years clipless bicycle pedals have become increasingly popular among bicyclists who participate in both touring and racing. The old style toe clip pedal often caused discomfort by placing pressure on the top of the foot and could tend to be awkward and bulky for racers. Major advantages of the clipless pedals are comfort and aerodynamics.

However, current designs of clipless pedals have a number of problems. Most current styles of clipless pedals use a ski binding principle which requires setting a tension to properly engage and disengage the pedal using a single spring which presses the cleat forward against a groove/tab combination at the front of the pedal. Even if properly set, however, a strong movement of the foot (for example taking off from a stop) could result in accidental release causing the rider to fall. In other instances if the tension is improperly set it may become too difficult for the rider to release his foot once it is engaged in the pedal, also causing a possibility of fall. Some styles of pedals hold the foot too rigidly, preventing natural rotation of the knee as the bike is being pedaled. This often results in knee injury to avid cyclists. While some styles of clipless pedals have been designed to compensate for natural rotation of the knee, they have given up some of the firmness with which the foot is secured to the pedal.

Another problem is the high profile of some pedals which interferes with pedaling while cornering. Insufficient pedal clearance while turning is one of the primary causes of accidents during bicycle competitions. The rider must stop pedaling through the turn or risk hitting the pedal on the ground. Striking a pedal on the ground during a turn lifts the bike's rear wheel off the ground with the bicycle pivoting on the pedal. This inevitably results in a fall.

Further, the asymmetrical design of prior art pedals means that there is only one orientation in which the pedal may be used. The rider must hunt for the proper alignment before engaging the cleat in the pedal, with many of the smaller designs requiring careful and conscious placement of the foot. This can distract the rider from watching for road hazards and can hinder takeoff from a stop. A slip of the foot while attempting to engage the pedal and cleat most often results in a painful fall onto the bicycle crossbar. Some asymmetric design clipless pedals have included a means to enable the rider to more easily find the pedal and engage it with the cleat. These pedals utilize a spring or clip which is released when the rider removes his foot from the pedal. The spring presses against the spindle causing the pedal to stay upright after it is disengaged. The spring is compressed again when the cleat engages the pedal, allowing free rotation of the pedal.

Another major disadvantage of many of the clipless pedal systems is the size of the cleat extending downward from the bottom of the shoe. The knobby protrusions of the cleats often make it awkward or impossible to walk without falling or ruining the cleat.

It would therefore be advantageous to have a low profile symmetrical pedal which is easy to engage and disengage yet will firmly hold the cleat against pressure of normal riding. While it is recognized that the cleat is required to extend a certain distance from the bottom of the shoe, it would be preferable to have a flat rather than a knobby cleat protruding from the bottom of the shoe which will enable the rider to walk once he leaves his bicycle.

SUMMARY OF THE INVENTION

The present invention proposes a clipless pedal system which is easily engaged and released, when desired, and which allows a high cornering angle due to the pedal's shallow, symmetrical design. A clipless pedal system in accordance with the present invention comprises: a pedal and a cleat, the pedal consisting of an spindle attached to the end of a crank arm on which is mounted a block. The block has a generally convex symmetrical curved top and bottom surface, and is generally circular in the lateral plane. A plurality of grooves is formed in the circumferential edge of the pedal block, with at least one groove toward the leading edge of the pedal block and one toward the trailing edge.

The cleat comprises a plate fixed to the sole of a rider's shoe, projecting downwardly therefrom. The plate has a concave recess which corresponds to the convex surface of the pedal block when the plate is brought into contact with the pedal block. Contained in the recess of the plate is an engaging means which comprises a tongue portion adapted to be removably seated in one of the grooves in the pedal block. An urging means cooperates with the tongue portion to releasably secure the rider's shoe to the pedal.

(For brevity herein, the entire system will often be referred to as the "clipless pedal" or "clipless pedal system," including both the pedal itself and the cleat, as this terminology is common in the art. It will be readily determinable by those skilled in the art when the discussion below refers to the system and when it refers separately to the pedal or the pedal block.)

SUMMARY OF THE DRAWINGS

FIG. 4 is a side elevation view of the pedal and cleat engaged and latched with the cleat secured to the shoe.

FIG. 5 a sectional view taken on line 5—5 of FIG. 4.

FIG. 8 is a partial sectional view taken on line 5—5 of FIG. 4 of an alternate embodiment of the invention.

FIG. 9 is a partial sectional view taken on line 5—5 of FIG. 4 of a second embodiment of the invention.

DETAILED DESCRIPTION OF THE INVENTION

Figure 1:
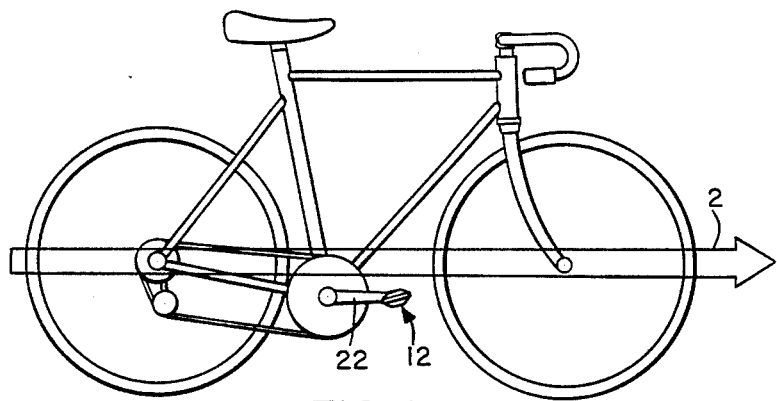
FIG. 1 is a side elevation view of a typical bicycle illustrating a longitudinal plane which will be used as a point of reference for the description of the invention.
Figure 2:
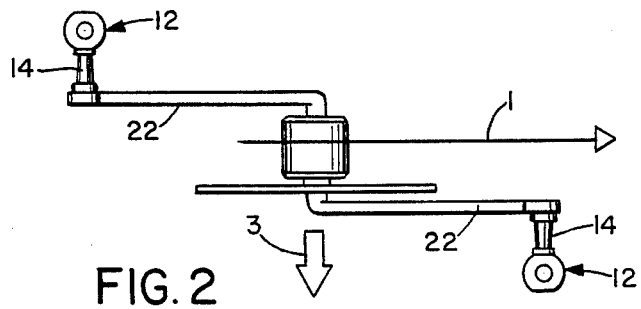
FIG. 2 is an enlarged top plan view of the pedal assembly illustrating an axis and a lateral plane which will be used as points of reference for the description of the invention.
Figure 3:
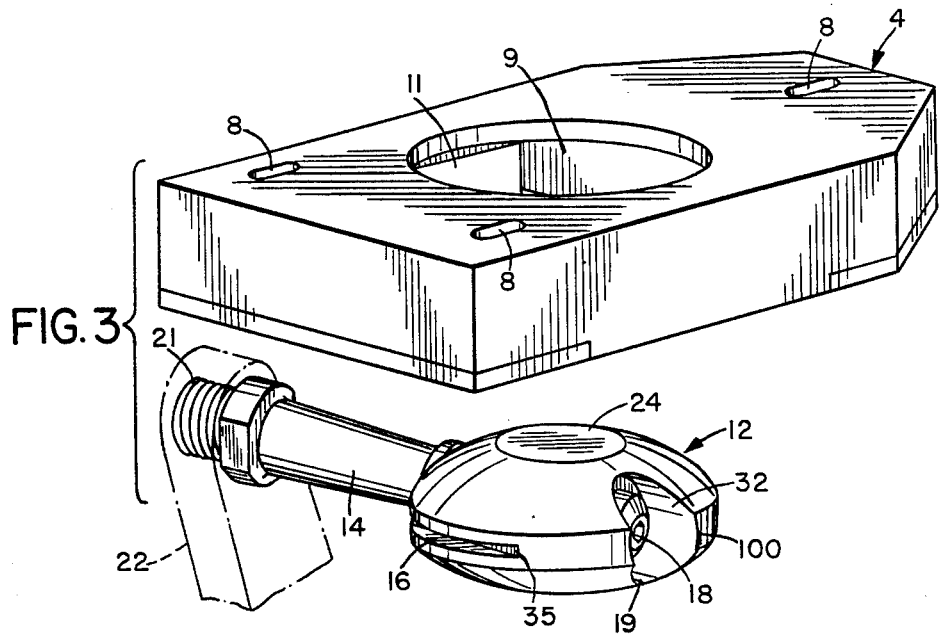
FIG. 3 is a perspective view of the pedal and cleat separated.

The invention herein will be most readily understood by reference to the drawings. FIGS. 1, 2 and 3 illustrate the pedal 12 and cleat 4 generally and their relation to the bicycle. The basic connections are conventional. In particular, pedal 12 comprises pedal block 12' attached to spindle 14 by bolt 18. Bolt 18 is preferably a hex bolt with a tapered head but may be any other type of bolt which will attach the pedal to spindle 14 to allow free rotation of the pedal around the spindle. Spindle 14 screws into crank 22 by means of right or left-handed threads, depending on whether it is the right or left pedal, so the spindle does not come unscrewed when the pedal is pushed.

The structures of pedal 12, cleat 4 and their cooperative relationship are the critical elements of this invention. The block 12' of pedal 12 has a generally circular shape in lateral plane 3 defined by arrow 3. Formed in the circumferential side 100 of block 12' (which side is preferably flattened as shown in FIG. 3) are grooves 16 and 17 which also lie in lateral plane 3 and which are disposed spaced apart from each other around the circumference of block 12'. Generally there are two grooves, as 16 and 17, located diametrically opposite to each other. It would also be possible to have each of these grooves be divided into smaller adjoining grooves. Alternatively, there may be three grooves disposed 120° apart, in the manner shown for a different embodiment in FIG. 11. However, since more grooves do not markedly improve the performance of the pedal system over that obtained with two or three grooves, the latter are preferred. The discussion herein will be in terms of the two- or three- groove system, as indicated, although those skilled in the art will recognize the applicability of the discussion to other numbers of grooves.

When bisected by a plane parallel to the longitudinal plane defined by arrow 2 in Figure block 12' is symmetrically convex with equivalent flat spots 24 on the top and bottom of the pedal. The flat spot 24 which at any time is uppermost provides the contact surface for sole 26 of shoe 25. The right and left pedals are identical, except that (as is conventional) the axles for the left and right sides of the bicycle require left and right hand threads, respectively.

Pedal 12 may be made of any lightweight rigid material which is durable when subjected to stresses related to bicycle riding. The material should be able to withstand impact without fracturing or deforming. Preferred are aluminum or titanium, but rigid durable plastics may also be used. Similar or identical material may be used for cleat 4, although plastics are preferred to metals for comfort in walking.

Figure 6:
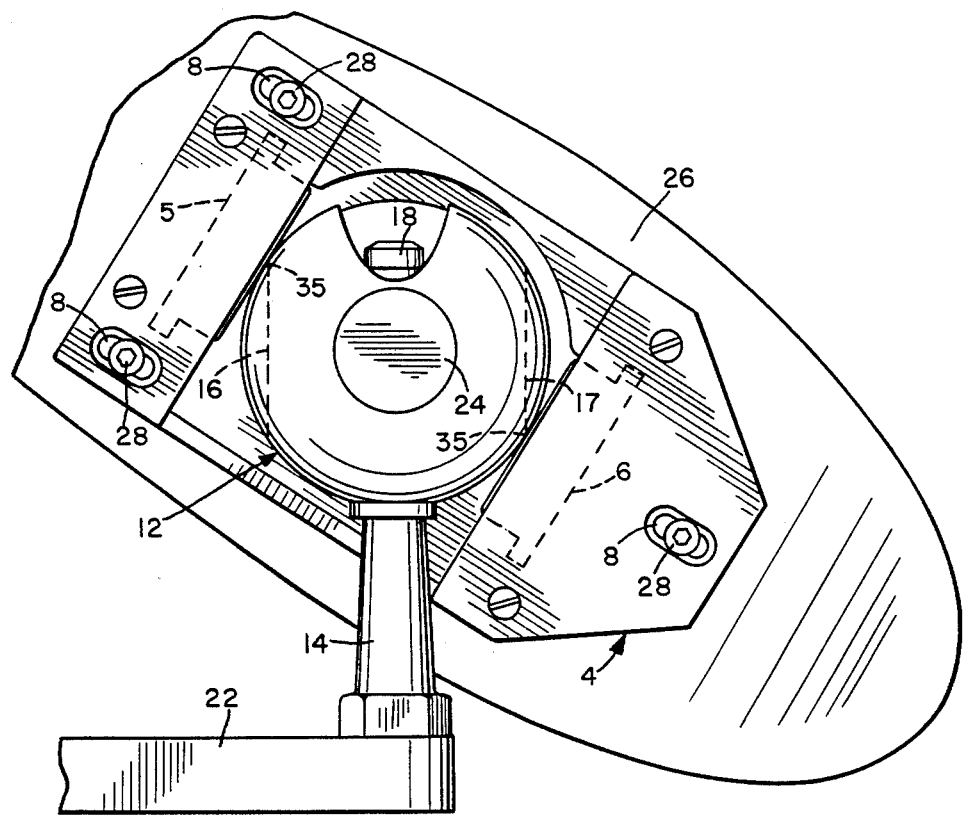
FIG. 6 is an underside view showing the shoe rotated to disengage the cleat from the pedal.

Cleat 4 has a recessed area 11 into which pedal 12 is to be inserted. The depth is not critical, but preferably, the depth of recessed area 11 is slightly more than half the depth of block 12'—enough to allow secure insertion of the pedal. Cutout 9 in the center of cleat 4 allows contact between shoe sole 26 and pedal 12 when the pedal 12 and cleat 4 are connected. Mounting holes 8 formed in cleat 4 are spaced so as to fit commercially available shoes. Mounting holes 8 (as shown in FIG. 6) are elongated so as to allow for adjustment in the location of the cleat with respect to the pre-drilled holes and the sole of the shoe.

The cooperation between pedal 12 and cleat 4 is illustrated in FIG. 4. The rider places the shoe 25 with cleat 4 over pedal 12. The symmetrical curved top surface of the pedal centers the recessed area II over pedal 12, guiding cleat 4 to its proper position. Even if the pedal is not parallel to lateral plane 3 at the time the rider initially attempts to engage cleat 4 and pedal 12, the curved surface 13 of pedal 12 will cause block 12' to rotate so that cleat 4 is centered over pedal 12. When pedal 12 is fully inserted into cleat 4, tongue 5 and tongue 6 fit into grooves 16 and 17, respectively. Because block 12' is symmetrical at the top and bottom, grooves 16 and 17 are interchangeable so that tongue 5 can be inserted into groove 17 and tongue 6 can be inserted into groove 16 when the block 12' is turned over.

FIG. 4 also illustrates the means of attaching cleat 4 to shoe sole 26. Fasteners 28 (which may be screws, bolts, or equivalent fasteners) are inserted through mounting holes 8 and into aligned pre-drilled, threaded holes 27 in the sole of the shoe.

Tongues 5 and 6, which are flat plates of either durable plastic or lightweight metal are shown engaged in the grooves 16 and 17 of pedal 12 in FIG. 5. Tongues 5 and 6 are pressed into grooves 16 and 17 by springs 30. When the curved surfaces 13 of block 12' press against either tongue, spring 30 is depressed and the tongue retracts into cavity 29. Insertion of pedal 12 into the recessed area 11 such that tongues 5 and 6 are aligned with grooves 16 and 17 causes springs 30 to resile, pressing the tongues into the grooves.

In an alternate embodiment, shown in FIG. 8, each tongue and spring combination is replaced with a flexible wire 40 which is attached to opposing pegs or screws 42. The wire has a spring quality such that it can be depressed to allow pedal 12 to enter recessed area 11, but will snap back into grooves 16 and 17 when wire 40 and the grooves are aligned. In order for cleat 4 to be held to pedal 12 against the forces exerted while pedaling, the wire must have sufficient stiffness that it will retain the connection between the cleat and the pedal against sudden motions of the rider's foot.

Another alternate embodiment, shown in FIG. 9, replaces the flat plate tongues with a rod 46 which is attached to the spring 30. Both the rod 46 and the spring 30 are held in place within cavity 29 by pegs or screws 48.

When the rider wishes to disengage the pedal the foot is rotated as shown in FIG. 6. Once the foot is rotated sufficiently the grooves will no longer be aligned with the tongues. End 35 of groove 16 or 17 initiates depression of the spring. As the foot is further rotated tongues 5 and 6 become fully depressed and are fully withdrawn from the grooves so that the foot may be lifted off of the pedal. By varying the length of grooves 15 and 16 the point at which end 35 of the groove initiates depression of the spring may be predetermined. The amount of rotation of the foot required to disengage the pedal can be optimized to prevent unintentional disconnection while still allowing intentional removal of the foot from the pedal with a minimal rotation, typically 10 to 15 degrees. Groove length and depth are large enough to retain the connection against sudden motions of the rider's foot which are encountered, for example, when climbing hills or when starting from a full stop but not so great as to make disengagement of the pedal and cleat overly difficult. Normal rotations of the foot which are required for knee flexions, usually less than 5 degrees, are not sufficient to cause the springs to be depressed sufficiently to disengage the pedal.

Free rotation of block 12' around the spindle 14 is enabled by sets of ball bearings 34 shown in FIG. 5. As the pedal is pressed shoe 25 remains essentially parallel to the ground while spindle 14 transfers the force of the rider's pedaling to crank 22. Two ball bearing sets 34 are shown; however, any number of ball bearing sets which allow free rotation of the pedal around the spindle will serve the purpose. Bearings 34 and the spindle portions internal to the pedal should be protected by a washer 38 and any other method to prevent dirt from entering the interior of the pedal and clogging the bearings.

The cleat 4 shown in cross-section in FIG. 4 will preferably have sloped edges at the leading and trailing edges of the cleat 44 and 46, respectively, to decrease wind resistance while riding and to enable the rider to walk after dismounting the bike. The sloped or curved edges of the cleat will allow the rider to walk with a rolling motion rather than awkwardly trying to avoid putting any weight on the protruding knobs or abrupt edges that are present in most clipless pedal systems. The generally flat profile of cleat 4 protects the critical parts of the fastening mechanism which are contained within recessed area 11. Tongues 5 and 6, or wires 40, are shielded from breakage or wear associated with walking on the cleat.

Figure 7:
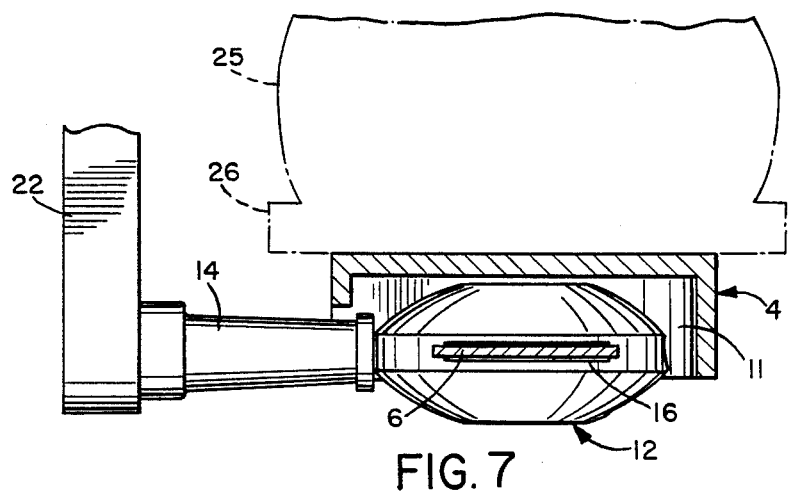
FIG. 7 sectional view taken on line 7—7 of FIG. 4.

The shallow profile of the pedal shown in FIG. 7 illustrates that the bottom of pedal 12 extends only a small distance beyond crank 22 at the lowest point in its rotation. The low profile allows the rider to continue pedaling while maintaining a steep lean angle for cornering. Also, advantageously the outer portion of block 12' is cut away or truncated as shown at 32 to provide a recess for the end of spindle 14 and attaching bolt 18. This prevents the spindle 14 from extending beyond the outer side of block 12' and allows the rider to make turns at a steeper angle without striking the end of the pedal on the road.

Figure 10:
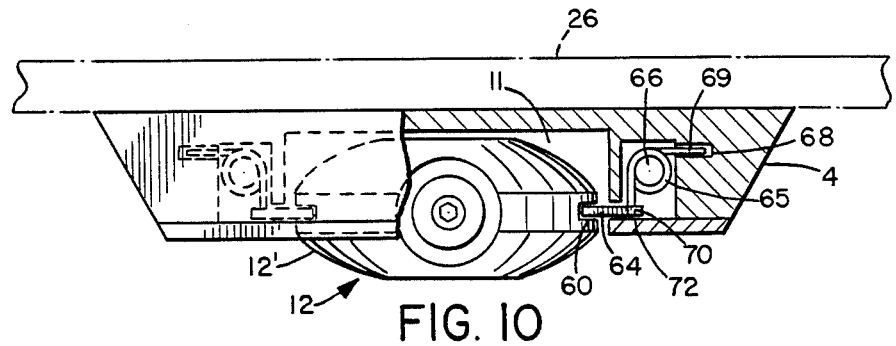
FIG. 10 is a side elevation view, partially cut away, of another embodiment of the pedal-and-cleat system of this invention.
Figure 11:
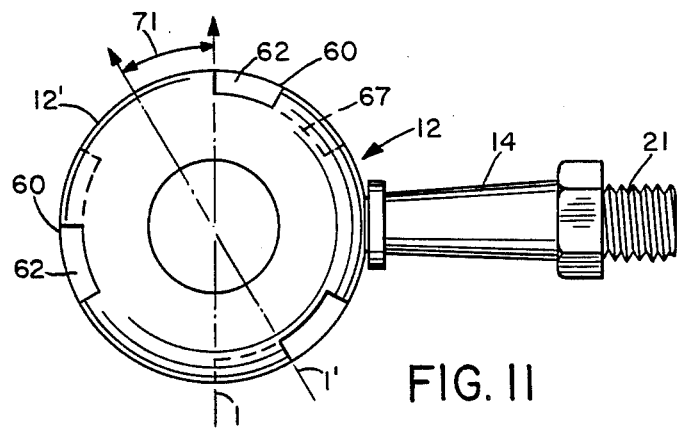
FIG. 11 is a plan view of the pedal of FIG. 10.
Figure 12:
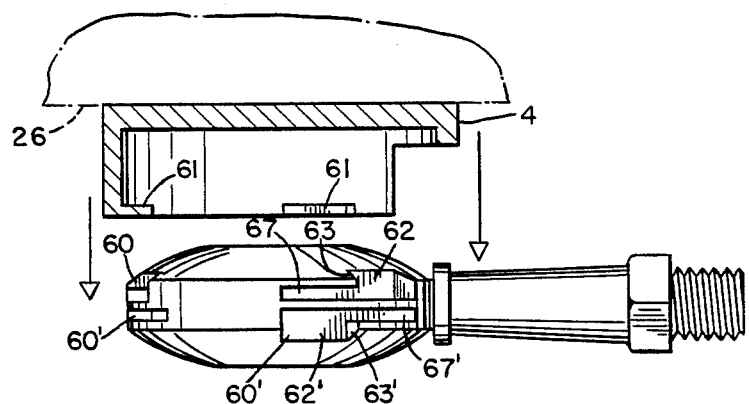
FIG. 12 is a front elevation view, partially in section, illustrating the locking mechanism between the pedal and cleat of the system of FIG. 10.

Another embodiment of the pedal and cleat engagement is illustrated in FIGS. 10-12. In this alternate embodiment the block 12' has fixed grooves 60 (preferably three) spaced apart around its circumference. These grooves align with tongues 64 of cleat 4, but the width of each tongue 60 is less than the length of the corresponding groove 60. When the rider's foot is off the pedal 12, the tongues 60 of the cleat 4 align with the open top end portion 62 of groove 60, which provides access to the remainder of the groove 60. That open portion 62 is, however, oriented to be out of alignment with the longitudinal axis 1 of the pedal, so that in order to line up the tongues 64 and grooves 60 the rider's foot must be turned away from that axis 1 to the axis shown as 1' and indicated by the double-headed arrow 71. The rider then pushes his or her foot downward into the opening 62 until the bottom of the tongue 64 contacts the floor of groove 60 under the opening 62. Then the rider rotates his or her foot back to the axis 1 and the tongue 64 slides along groove 60 past shoulder 63 into recessed portion 67, where it is locked into position. Coil spring 65, rotating on pivot 66 and with one end 69 locked in socket 68 and the other end 70 fitted into a hole 72 in tongue 64, urges the tongue 64 into continual engagement with portion 67 of the groove 60.

It will be noted from FIG. 12 that the block 12' has pairs of grooves (designated as 60 and 60') on opposite sides of the block 12', so that no matter which side is up the rider's shoe cleat 4 will be engageable with the pedal 12. (The portions of the grooves 60' shown in FIG. 12 are labelled with primes to indicated the correspondence with the equivalent portions of the grooves 60.)

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A clipless bicycle pedal system for releasably binding the sole of a rider's shoe to a pedal which comprises:
   a pedal comprising:
   an axle fixedly attached to the end of a crank arm of a bicycle; and
   a block rotatably mounted on said axle, said block having a top, a bottom and a circumferential edge, said top and said bottom each being a generally convex surface, said block being generally circular in the lateral plane with said circumferential edges joining said top to sid bottom and a leading edge and a trailing edge oppositely disposed within said circumferential edge, and having a plurality of grooves formed in said circumferential edge of said pedal and aligned with longitudinal and lateral planes of a bicycle on which said pedal system is mounted, at least one of said grooves toward said trailing edge of said pedal block and one toward said leading edge; and
   a cleat comprising:
   a plate member to be fixed to said sole of said rider's shoe and projecting downwardly therefrom, said plate member having a concave recess therein which generally corresponds to a portion of said convex surface of said pedal block, said convex pedal surface being disposed in said concave recess when said plate member is brought into contact with said pedal block;
   a plurality of engaging means, each engaging means comprising a tongue portion adapted to be removably seated in one of said grooves in said pedal block; and
   urging means cooperating with said tongue portion of said engaging means to releasably secure said rider's shoe to said pedal.

2. A pedal system as in claim 1 wherein said top and bottom surfaces of said pedal block are symmetrical such that either convex surface will engage said cleat.

3. A pedal system as in claim 1 wherein said pedal block is generally flattened at said circumferential edge in which said plurality of grooved is formed.

4. A pedal system as in claim 1 wherein said plurality of grooves comprises two grooves disposed at the diametrically opposite points of said circumferential edge on the longitudinal axis of said pedal block.

5. A pedal system as in claim 1 wherein said urging means of said cleat comprises a spring.

6. A pedal system as in claim I wherein said pedal block is shallow in vertical dimension.

7. A pedal system as in claim 1 wherein the outer end of said pedal block is truncated.

8. A pedal system as in claim 1 wherein the leading and trailing edges of said cleat are sloped.

9. A pedal system as in claim 1 wherein said plurality of grooves and tongue portions are each configured such that when said pedal is inserted into said concave recess, said tongue portion is forced to retract from said pedal by depressing said urging means.

10. A pedal system as in claim 1 wherein each groove of said plurality of grooves and said tongue portion are configured such that when said pedal is fully disposed into said concave recess of said cleat, said tongue portion resiles into said groove.

11. A pedal system as in claim 1 wherein each groove of said plurality of grooves and said tongue portion are configured such that when said cleat is rotated with respect to said pedal, said tongue portion is urged out of said groove to release said cleat from said pedal.

12. A pedal system as in claim 1 wherein said cleat is secured to said pedal by engaging each said tongue portion into a corresponding groove to the full depth of said groove and then rotating said cleat to cause said tongue to move within said groove into a recessed portion of said groove.

13. A pedal system as in claim 1 wherein said tongue portion comprises a flat plate.

14. A pedal system as in claim 13 wherein said urging means comprises a coil spring or a leaf spring.

15. A pedal system as in claim 1 wherein each of said tongue and said urging means are unified in the form of a flexible metal wire.

16. A pedal system as in claim 15 wherein each said groove and said wire are configured such that when said pedal is inserted into said concave recess, said wire is forced to flex away from the pedal, expanding the opening into which the pedal is being disposed.

17. A pedal system as in claim 15 wherein each said groove and said wire are configured such that when said pedal is fully disposed into said concave recess of said cleat, said wire resiles into said groove.

18. A pedal system as in claim 15 wherein each said groove and said wire are configured such that when said cleat is rotated with respect to said pedal, said wire is urged out of said groove to release said cleat from said pedal.

19. A pedal system as in claim 1 wherein said tongue comprises a small diameter rod which is fixedly attached to said urging means.

20. A pedal system as in claim 19 wherein each said groove and said rod are configured such that when said pedal is inserted into said concave recess, said rod is forced to retract from said pedal by depressing said urging means, thereby expanding the opening into which said pedal is being disposed.

21. A pedal system as in claim 19 wherein each said groove and said rod are configured such that when said pedal is fully disposed into said concave recess of said cleat said rod resiles into said groove.

22. A pedal system as in claim 19 wherein each said groove and said rod are configured such that when said cleat is rotated with respect to said pedal, said rod is urged out of said groove to release said cleat from said pedal.

23. A pedal system as in claim 1 wherein said pedal block is generally oval, with said spindle being the major axis of said pedal block.

* * * * *